(12) United States Patent
Gustafson et al.

(10) Patent No.: US 7,725,889 B2
(45) Date of Patent: May 25, 2010

(54) MOBILE HANDSET CAPABLE OF UPDATING ITS UPDATE AGENT

(75) Inventors: James P. Gustafson, Irvine, CA (US); Shao-Chun Chen, Aliso Viejo, CA (US); Toni Pakarinen, Ladera Ranch, CA (US); Do P. Nguyen, San Diego, CA (US); Sunil Marolia, Dana Point, CA (US); Karl W. Hammerberg, Overland Park, KS (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1260 days.

(21) Appl. No.: 10/756,103

(22) Filed: Jan. 13, 2004

(65) Prior Publication Data

US 2004/0243991 A1  Dec. 2, 2004

Related U.S. Application Data

(60) Provisional application No. 60/439,673, filed on Jan. 13, 2003.

(51) Int. Cl.
*G06F 9/44* (2006.01)
*G06F 9/445* (2006.01)
*G06F 11/00* (2006.01)

(52) U.S. Cl. .................... 717/168; 717/174; 714/2
(58) Field of Classification Search .......... 717/168–178
See application file for complete search history.

(56) References Cited

U.S. PATENT DOCUMENTS

| 5,261,055 A | 11/1993 | Moran et al. ............. 395/275 |
| 5,442,771 A | 8/1995 | Filepp et al. ............. 395/650 |
| 5,479,637 A | 12/1995 | Lisimaque et al. ........ 395/430 |
| 5,579,522 A | 11/1996 | Christeson et al. ....... 395/652 |
| 5,596,738 A | 1/1997 | Pope ....................... 395/430 |
| 5,598,534 A | 1/1997 | Haas ...................... 395/200.09 |
| 5,608,910 A | 3/1997 | Shimakura .............. 395/670 |
| 5,623,604 A | 4/1997 | Russell et al. ........... 395/200.1 |
| 5,666,293 A | 9/1997 | Metz et al. .............. 395/200.5 |
| 5,752,039 A | 5/1998 | Tanimura ................ 395/712 |

(Continued)

FOREIGN PATENT DOCUMENTS

CA       2339923        3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Michael J Yigdall
*Assistant Examiner*—Ben C Wang

(57) ABSTRACT

A mobile handset in a mobile services network, with access to a plurality of services including a firmware/software update service, is also capable of updating its update agent using an appropriate update package. The update package is retrieved from an update package repository via a management server. In one embodiment, the existing update agent is copied to a backup section before the update agent itself is updated. On the subsequent reboot, the new update agent is employed unless it is determined that it is corrupted or ineffective, in which case the old update agent is reactivated.

19 Claims, 5 Drawing Sheets

U.S. PATENT DOCUMENTS

| | | | |
|---|---|---|---|
| 5,778,440 A | 7/1998 | Yiu et al. | 711/154 |
| 5,790,974 A | 8/1998 | Tognazzini | 701/204 |
| 5,838,981 A | 11/1998 | Gotoh | |
| 5,878,256 A | 3/1999 | Bealkowski et al. | 395/652 |
| 5,960,445 A | 9/1999 | Tamori et al. | 707/203 |
| 5,974,574 A | 10/1999 | Lennie | |
| 6,009,497 A | 12/1999 | Wells et al. | 711/103 |
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |
| 6,438,585 B2 | 8/2002 | Mousseau et al. | 709/206 |
| 6,748,209 B2 | 6/2004 | Lipsit | |
| 6,820,259 B1* | 11/2004 | Kawamata et al. | 717/173 |
| 6,941,136 B2 | 9/2005 | Study | |
| 7,055,148 B2* | 5/2006 | Marsh et al. | 717/172 |
| 7,065,347 B1* | 6/2006 | Vikse et al. | 455/419 |
| 7,082,549 B2* | 7/2006 | Rao et al. | 714/6 |
| 7,216,343 B2* | 5/2007 | Das et al. | 717/168 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0163805 A1 | 8/2003 | Hata | |
| 2004/0031029 A1* | 2/2004 | Lee et al. | 717/171 |
| 2004/0194081 A1* | 9/2004 | Qumei et al. | 717/173 |
| 2004/0226008 A1* | 11/2004 | Jacobi et al. | 717/168 |
| 2004/0243993 A1* | 12/2004 | Okonnen et al. | 717/168 |
| 2005/0114852 A1* | 5/2005 | Chen et al. | 717/168 |
| 2005/0132351 A1* | 6/2005 | Randall et al. | 717/168 |
| 2005/0257214 A1* | 11/2005 | Moshir et al. | 717/171 |
| 2007/0089108 A1* | 4/2007 | Chen et al. | 717/168 |
| 2007/0169099 A1* | 7/2007 | Rao et al. | 717/168 |
| 2008/0114925 A1* | 5/2008 | Yang | 711/103 |
| 2008/0184220 A1* | 7/2008 | Chen et al. | 717/171 |

FOREIGN PATENT DOCUMENTS

| | | |
|---|---|---|
| DE | 10115729 | 10/2001 |
| JP | 8202626 | 8/1996 |
| KR | 2002-0034228 | 5/2000 |
| KR | 2001-0100328 | 11/2001 |
| WO | 0241147 | 5/2002 |
| WO | WO 02/41147 A1 * | 5/2002 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

European Search Report, dated Feb. 6, 2009.

PCT International Search Report dated Oct. 3, 2008.

* cited by examiner

MOBILE HANDSET CAPABLE OF UPDATING ITS UPDATE AGENT

RELATED APPLICATIONS

This patent application makes reference to, claims priority to and claims benefit from U.S. Provisional Patent Application Ser. No. 60/439,673, entitled "Mobile Handset Capable of Updating its Update Agent," filed on Jan. 13, 2003.

The complete subject matter of the above-referenced U.S. Provisional Patent Application is hereby incorporated herein by reference, in its entirety. In addition, this application makes reference to U.S. Provisional Patent Application Ser. No. 60/249,606, entitled "System and Method for Updating and Distributing Information", filed Nov. 17, 2000, and International Patent Application Publication No. WO 02/41147 A1, entitled "Systems And Methods For Updating And Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

Problems may arise when informing a mobile handset of a need to update its firmware or software. Additionally, the mobile handset may utilize an update agent or driver in the update process, and the update agent or driver may also require updating. Such updates may be complicated and a mobile handset may become inoperative if such an update should fail.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a system that facilitates the updating of at least one of firmware and updating software in an electronic device, using updating information received via a communication network, the system comprising a non-volatile memory; a RAM; and security services for verifying the loaded updating information. The non-volatile memory comprises firmware; loading software for loading the updating information via the communication network; updating software for applying the loaded updating information to the at least one of firmware and updating software; and initializing software for initializing the electronic device. In an embodiment of the present invention, the updating software is capable of updating itself. The updating software is also capable of saving a back up copy of itself when it updates itself. In an embodiment of the present invention, the updating software can determine whether an updating process was successful, and if not, the updating software uses the back up copy of itself.

A method for updating at least one of firmware and updating software in an electronic device, using updating information received via a communication network, the method comprising initializing the electronic device; and determining whether at least one of the firmware and the updating software is to be updated. If it is determined that no updating needs to be done, the method further comprises performing a normal start up of the electronic device. Otherwise, if it is determined at least one of the firmware and the updating software needs to be updated, the method further comprises determining whether the updating software needs to be updated.

If it is determined that the updating software does not need updating and the firmware needs updating, the method further comprises updating the firmware using the updating information; and initializing the electronic device. Otherwise, if it is determined that the updating software needs to be updated, the method further comprises backing up the updating software; updating the updating software using the updating information to produce a new updating software; initializing the electronic device; and determining whether the updating of the updating software was successful.

If it is determined that updating the updating software was successful, the method further comprises enabling the use of the new updating software; and initializing the electronic device. Otherwise, if it is determined that updating the updating software was not successful, the method further comprises using the backed up updating software; and initializing the electronic device.

These and other features and advantages of the present invention may be appreciated from a review of the following detailed description of the present invention, along with the accompanying figures in which like reference numerals refer to like parts throughout.

DETAILED DESCRIPTION OF THE INVENTION

The present invention relates generally to updates of firmware/software components in electronic devices such as, for example, mobile handsets, and specifically to the update agent in electronic devices being capable of updating itself. Although the following discusses aspects of the invention in terms of a mobile handset, it should be clear that the following discussion also applies to other mobile electronic devices such as, for example, personal digital assistants (PDAs), pagers, personal computers (PCs), and similar handheld electronic devices.

Figure 1:
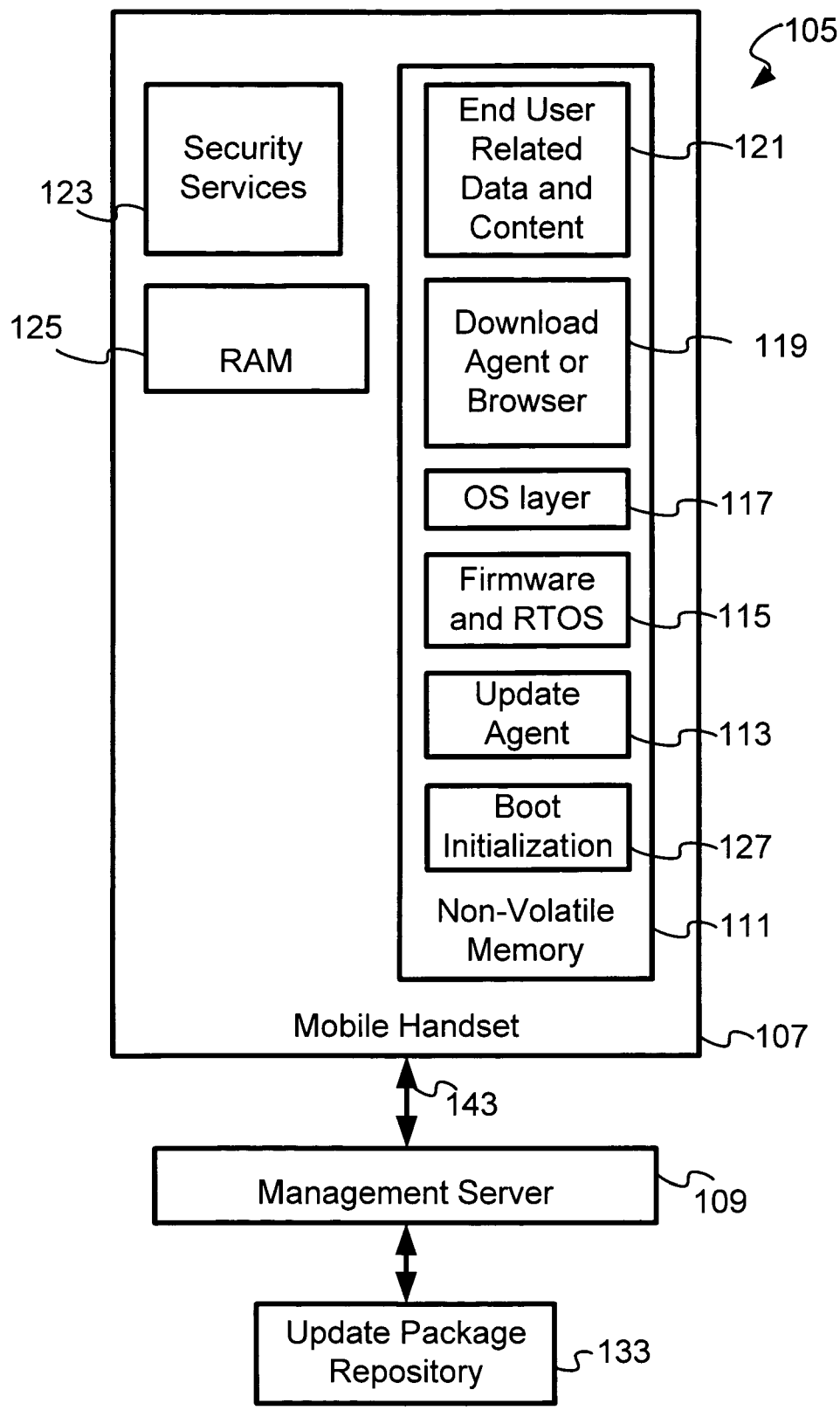
FIG. 1 illustrates a block diagram of an exemplary mobile services network, in accordance with an embodiment of the present invention.

FIG. 1 illustrates a block diagram of an exemplary mobile services network 105, in accordance with an embodiment of the present invention. The mobile services network 105 may comprise a mobile handset 107, a management server 109, and an update package repository 133. In an embodiment of the present invention, an update package may contain information needed to upgrade software/firmware in the mobile handset 107 from one version to another. In an embodiment of the present invention, the mobile handset 107 may have access to services such as, for example, firmware/software update services. The mobile handset 107 may retrieve an update package from the management server 109 and confirm the authenticity of an update package before initiating the update process. In an embodiment of the present invention, the mobile handset 107 may utilize an update agent 113 in the update process. The mobile handset 107 may be linked to the management server 109 via a communication network 143. The communication network 143 may be a wireless or a wired network. In an embodiment of the present invention, the communication network 143 may be an existing network such as, for example, the Internet or a service (public) network such as, for example, a cellular wireless network, or a private network specifically designed for connecting a plurality of mobile handsets 107 and management servers 109.

In an embodiment of the present invention, the mobile handset 107 may comprise a non-volatile memory 111, a random access memory (RAM) 125, and security services 123. The non-volatile memory 111 of the mobile handset 107 may comprise an update agent 113, firmware and real-time operating system (RTOS) 115, an operating system (OS) layer 117, a download agent or browser 119, end-user-related data and content 121, and boot initialization 127.

In an embodiment of the present invention, the mobile handset 107 may download an update package from the update package repository 133 to update the update agent 113, and the mobile handset 107 may then reboot. The availability of update packages may be recorded in status information that may be stored in non-volatile memory 111 in the mobile handset 107. Upon a subsequent startup, the mobile handset 107 may execute the boot initialization 127, and then determine whether there is a need to execute the update agent 113 based on status information that may be available in the non-volatile memory 111. If the mobile handset 107 determines that the update agent 113 needs to execute the update process, the mobile handset 107 may invoke the update agent 113. In an embodiment of the present invention, the update agent 113 may determine that the update agent 113 itself needs to be updated. The update agent 113 may then create a backup of itself in a backup section such as, for example, a working flash bank (WFB) of the non-volatile memory 111 before updating the update agent 113, to provide for the recovery of the copy of the existing update agent 113 if the update process fails for any reason. Thus, the update agent 113 may provide updating in the mobile handset 107 in a fault tolerant manner utilizing a fault tolerant technique, an example of which may be found in International Patent Application Publication No. WO 02/41147 A1, entitled "Systems And Methods For Updating And Distributing Information," publication date Mar. 23, 2002, the complete subject matter of which is hereby incorporated herein by reference, in its entirety.

Figure 2A:
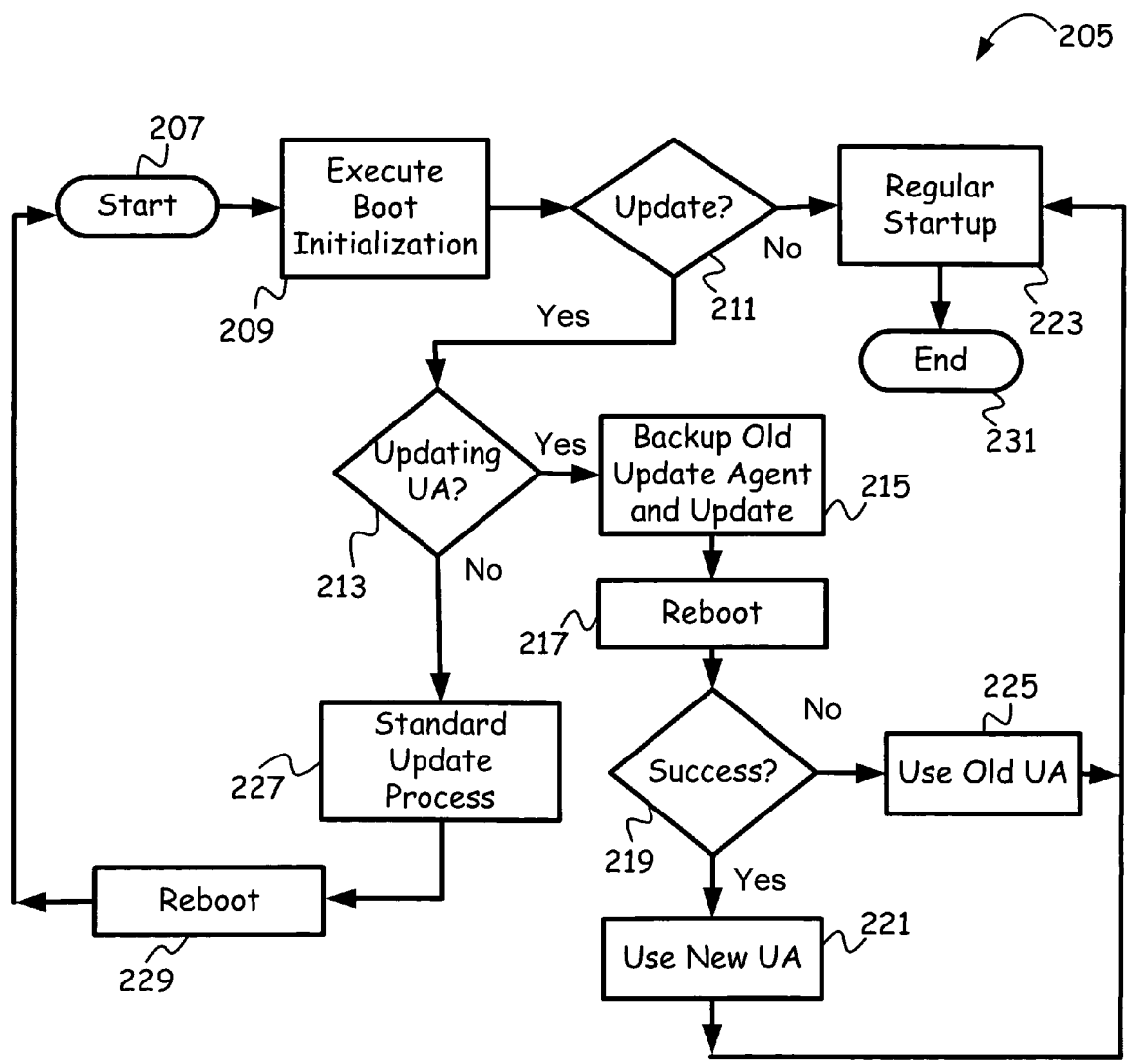
FIG. 2a illustrates a flow diagram of an exemplary method of operating a mobile handset when it powers up or reboots to start a firmware/software update using an update agent, in accordance with an embodiment of the present invention.

FIG. 2a illustrates a flow diagram of an exemplary method of operating a mobile handset when it powers up or reboots to start a firmware/software update using an update agent, in accordance with an embodiment of the present invention. The following discussion of FIG. 2a makes reference to items shown in FIG. 1. At a start block 207, the processing may start when the mobile handset such as, for example, the mobile handset 107 of FIG. 1 is powered up or rebooted. Then, at a next block 209, the mobile handset may execute the boot initialization code. At a next decision block 211, the mobile handset 107 may determine whether an update of firmware/update agent needs to be executed using the update agent such as, for example, the update agent 113 of FIG. 1. An appropriate update package may be retrieved via a management server such as, for example, the management server 109 of FIG. 1. If, at the decision block 211, the mobile handset 107 determines that an update is not needed, a regular startup of the mobile handset 107 may be initiated at a next block 223, and the process may terminate at the end block 231.

If, however, the mobile handset 107 determines that an update is to be executed, then at a next decision block 213, the mobile handset may determine whether the existing update agent 113 is to be updated. If the mobile handset 107 determines that the update agent 113 is not to be updated, then, at a next block 227, a standard update process may be invoked. A reboot of the mobile handset 107 may then be initiated at the next block 229 before processing returns to the start block 207.

If, at the decision block 213, the mobile handset 107 determines that the update agent 113 needs to be updated, then, at a next block 215, the existing (old) update agent 107 may be backed up in a backup section of non-volatile memory 111 in the mobile handset 107. The update agent 107 may then be updated employing the contents of the update package that may have been retrieved earlier and stored in the non-volatile memory 111 or in the RAM 125. Then, at a next block 217, the mobile handset 107 may be rebooted. At a next decision block 219, the mobile handset 107 may determine which update agent should be used: the updated update agent (new) or the old update agent that may be available in the backup section of non-volatile memory 111. It may be necessary to use the old update agent in situation such as, for example, when the new update agent may be corrupted or ineffective. If the mobile handset 107 determines that the new update agent may be used, then a regular startup of the mobile handset 107 may be initiated at a next block 223, and the process may terminate at the end block 231.

If, at the decision block 219, the mobile handset 107 determines that the new update agent may be corrupted or unusable, then, at a next block 225, the old update agent from the backup section of the non-volatile memory 111 may be reactivated. In an embodiment of the present invention, the old update agent may be copied back to the default location for an update agent 107 within the non-volatile memory 111. A regular startup of the mobile handset 107 may then be initiated at a next block 223, and the process may terminate at the end block 231.

Figure 2B:
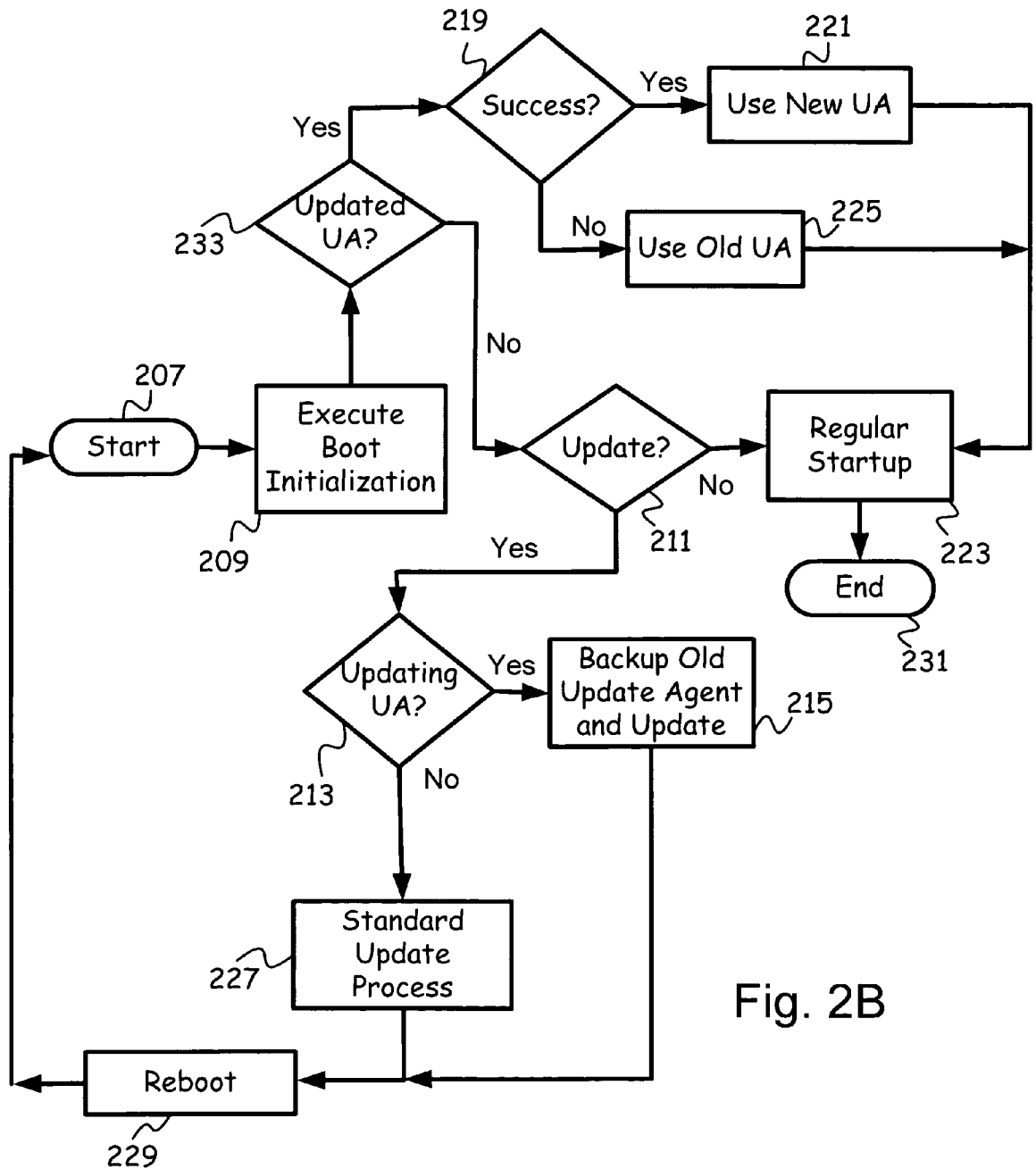
FIG. 2b illustrates a flow diagram of another exemplary method of operating a mobile handset when it powers up or reboots to start a firmware/software update using an update agent, in accordance with an embodiment of the present invention.

FIG. 2b illustrates a flow diagram of another exemplary method of operating a mobile handset when it powers up or reboots to start a firmware/software update using an update agent, in accordance with an embodiment of the present invention. The description of the exemplary embodiment of FIG. 2b is similar to that of FIG. 2a with the exception that following block 215, the mobile handset 107 may be rebooted at block 229. Processing may then restart at a start block 207, and boot initialization code may be executed at a next block 209. Then, at a next decision block 233, the mobile handset 107 may determine whether an update was performed on the update agent 113. If the mobile handset 107 determines that the update agent 113 was not updated, the process goes back to a next block 211. If the mobile handset 107 determines that the update agent 113 was updated, the process proceeds to block 219, and continues as described hereinabove.

In an embodiment of the present invention, updates to the update agent 107 may be used to fix bugs in an earlier version of the update agent, keep the update agent 107 current to accommodate the latest technologies and improvements, keep up to date with changes in the updating process, accommodate changes in the interface to the download agent that may be used by the mobile handset to download the update packages, etc.

Figure 3A:
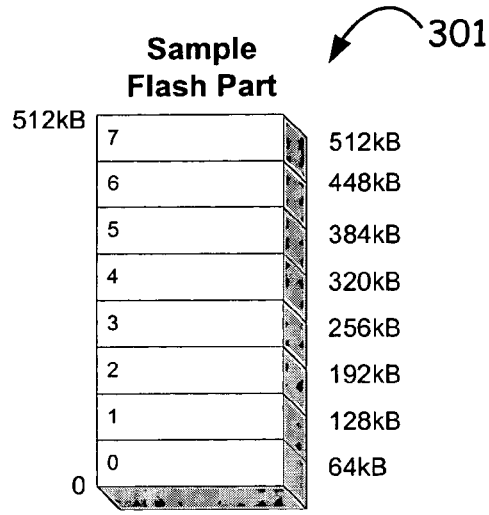
FIG. 3a illustrates an exemplary memory map of a mobile handset, in accordance with an embodiment of the present invention.

FIG. 3a illustrates an exemplary memory map 301 of a mobile handset such as, for example, the mobile handset 107 of FIG. 1, in accordance with an embodiment of the present invention. The memory map 301 represents a 512 kB flash memory section that may use uniform physical blocks of 64 kB each. The flash memory may be split into banks, each bank 64 kB in size. Thus 8 64 kB banks would result, shown in FIG. 3a as bank 0 to bank 7.

Figure 3B:
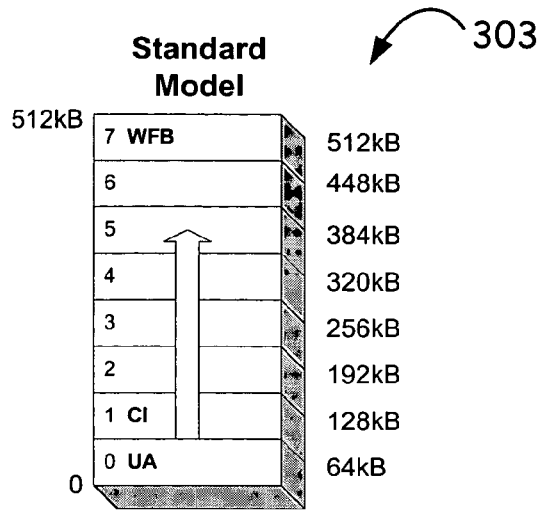
FIG. 3b illustrates an exemplary memory map divided into 8 banks, in accordance with an embodiment of the present invention.

FIG. 3b illustrates an exemplary memory map 303 divided into 8 banks, in accordance with an embodiment of the present invention. In an embodiment of the present invention, an update agent such as, for example, the update agent 113 of FIG. 1, of a mobile handset such as, for example, the mobile handset 107, may be positioned within the first bank, bank 0. A WFB may be placed in a free area of flash memory such as, for example, bank 7, and an image of the mobile handset firmware, which normally starts at address location 0x0 in bank 0, may be displaced to the second bank, bank 1. In an embodiment of the present invention, the positioning of the update agent may be done at a binary level, such that, the updated agent may not be compiled with the image of the mobile handset firmware. Instead, the update agent may be compiled independently and may not reference anything in the image of the mobile handset firmware directly. In an embodiment of the present invention, the image of the mobile handset firmware may be of any size, so long as the image of the mobile handset firmware does not grow into the space occupied by the WFB.

Figure 3C:
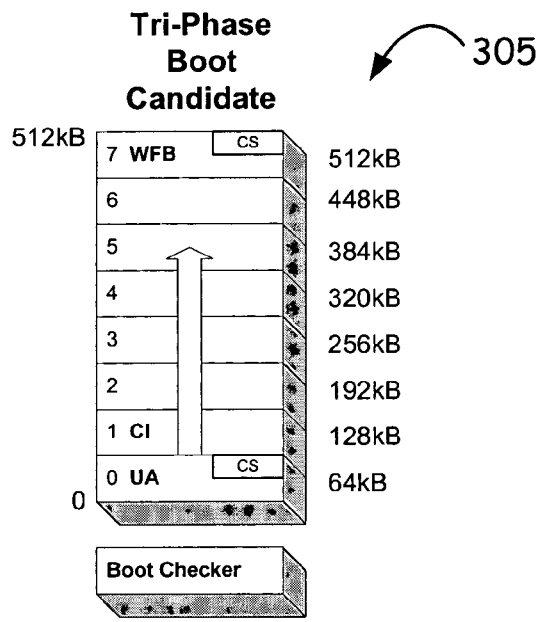
FIG. 3c illustrates an exemplary memory map using a tri-phase boot, in accordance with an embodiment of the present invention.

In an embodiment of the present invention, a tri-phase boot may be utilized in updating the update agent. FIG. 3c illustrates an exemplary memory map 305 using a tri-phase boot, in accordance with an embodiment of the present invention. In such an embodiment of the present invention, checksums may be associated with the first bank, bank 0, containing the update agent, and with the WFB bank, bank 7. A "Boot Checker" bank may also be added. In an embodiment of the present invention, each checksum may be used to validate the update agent that is associated with that bank. For example, the CS in the first bank, bank 0, is the checksum for the update agent in that bank. The checksum may be defined by the system designer according to the specific requirements or needs of the system and it may be a simple sum or a more complicated value such as, for example, cyclic redundancy code (CRC), MD5 checksum, hash code, etc. In an embodiment of the present invention, an update may have been already attempted, and the WFB may hold a copy of the original update agent along with its associated CS. The checksum may be computed for the original update agent firmware image soon after the compilation of the original update agent firmware image.

The "Boot Checker" may be a small piece of code that is the first code run upon boot-up. In an embodiment of the present invention, this code may include device specific functionality with the purpose of checking for a bank containing a valid update agent before branching to the update agent, because the updated original update agent may have been corrupted in a prior updating process.

Figure 4:
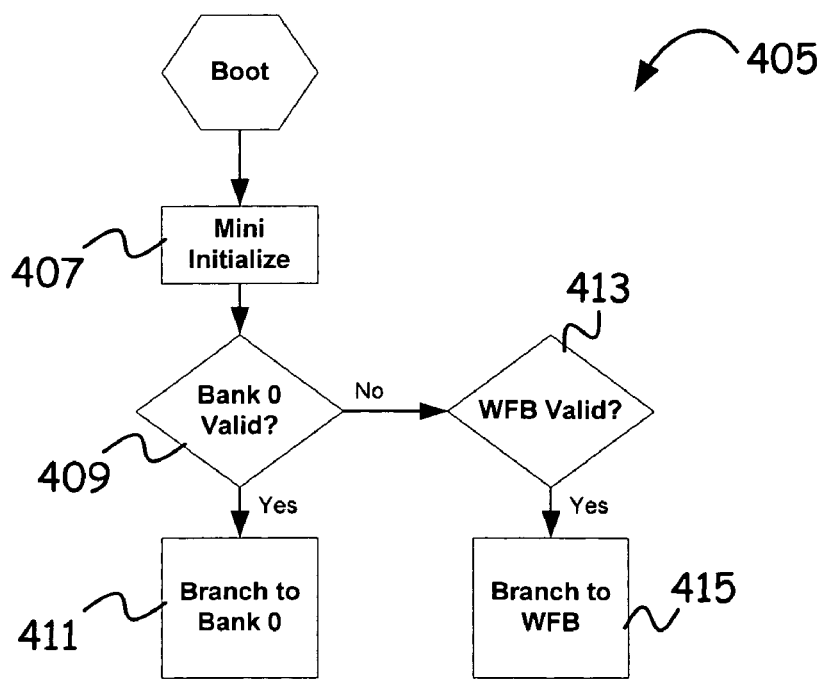
FIG. 4 illustrates a flow diagram of an exemplary tri-phase boot process, in accordance with an embodiment of the present invention.

FIG. 4 illustrates a flow diagram of an exemplary tri-phase boot process, in accordance with an embodiment of the present invention. After a minimal initialization in a mobile handset at block 407, the first bank, bank 0, may be checked for validity at block 409. The method chosen to calculate the checksum for this validity check may reside within the "Boot Checker" bank. If bank 0 were valid, it may be assumed that bank 0 contains the correct update agent, at block 411. The bank may include, in addition to the update agent, an initialization code that may have been used earlier.

In an embodiment of the present invention, if bank 0 were not valid, it may indicate that an update of the update agent was attempted but was interrupted. The WFB may then be checked for validity, at block 413, since the original update agent may be located in the WFB. The "Boot Checker" bank may then branch to the WFB at block 415.

In an embodiment of the present invention, the Tri-Phase Boot method may involve a process similar to that of updating the image of the mobile handset firmware. This approach may involve the update agent itself applying the update in the device. In an embodiment of the present invention, the checksum of the update agent may be applied to the update agent firmware image before generating the update package. In an embodiment of the present invention, an external tool such as, for example, an update package generator with a generator user interface may be used to calculate the checksum of the update agent firmware image. Using a generator and an update agent for updating the update agent, proper provisioning, security, and fault-tolerance may be maintained.

Figure 3D:
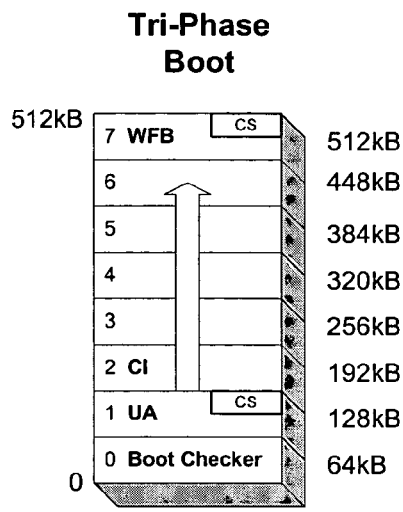
FIG. 3d illustrates another exemplary memory map using tri-phase boot, in accordance with an embodiment of the present invention.

FIG. 3d illustrates another exemplary memory map 307 using tri-phase boot, in accordance with an embodiment of the present invention. In an embodiment of the present invention, the first bank, bank 0, may be used as the "Boot Checker" and the update agent and image of the mobile handset firmware may be shifted forward by one bank, to banks 1 and 2, respectively.

Figure 3E:
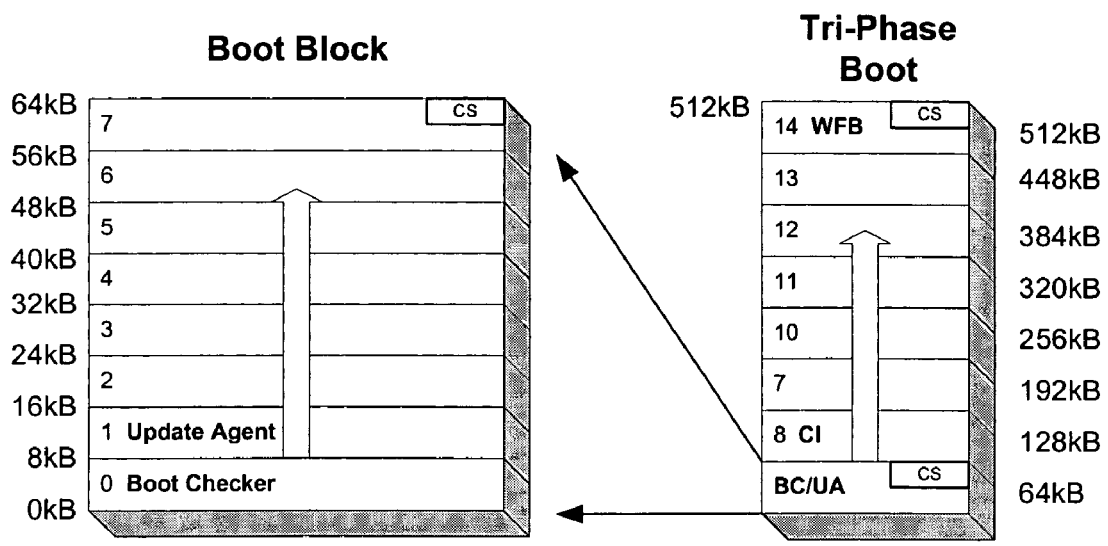
FIG. 3e illustrates an exemplary memory map using tri-phase boot utilizing "Boot Block" memory, in accordance with an embodiment of the present invention.

FIG. 3e illustrates an exemplary memory map using tri-phase boot utilizing "Boot Block" memory, in accordance with an embodiment of the present invention. In an embodiment of the present invention, the "Boot Block" may be comprised of 8 kB blocks. A small boot checker may be placed in block 0. The update agent may be positioned starting at bank 1 and may, as a result, occupy up to about 56 kB of space. In an embodiment of the present invention, the need for extra flash memory blocks is eliminated.

In an embodiment of the present invention, implementation of the boot checker may be done in Read Only Memory (ROM), mask ROM, or another flash device including internal flash.

Although the discussion hereinabove provided exemplary illustrations of memory maps with variables and components in specific locations, it should be clear that locations and sizes of memory blocks may be altered based on the requirements and the design of the specific systems.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system in an electronic device, that facilitates the updating of at least one of firmware and updating software in the electronic device, using updating information received via a communication network, the system comprising:
   a non-volatile memory comprising:
      firmware;
      loading software for loading the updating information via the communication network;
      updating software for applying the loaded updating information to the at least one of firmware and updating software; and
      initializing software for initializing the electronic device;
   a random access memory (RAM);
      security services for verifying the loaded updating information;
      wherein one of the initializing software and the updating software determines whether applying the updating information updates the updating software;
      wherein if it is determined that applying the updating information updates the updating software, the electronic device then updates the updating software using a first technique that:
         before the updating software is modified, saves a functional copy of the updating software in a working flash bank within a articular flash memory section of the non-volatile memory reserved for storing said functional copy;
         after saving said functional copy, processes a portion of the loaded updating information that updates the updating software;
         after updating the updating software, complete a tri-phase boot process using a boot checker in a boot checker bank also within the particular flash memory section, the tri-phase boot process involving a subsequent initialization, a validity check, and a branching functionality to branch between the updated updating software and the saved functional copy of the updating software, both within the particular flash memory section, based on the validity check; and
      wherein if it is determined that applying the updating information updates other than the updating software, the electronic device uses a second update technique that does not save a functional copy of the other than the updating software before processing updating information associated with the other than the updating software.

2. The system according to claim 1 wherein the loading software receives the updating information via the communication network.

3. The system according to claim 1 wherein the updating software is capable of updating itself.

4. The system according to claim 3 wherein the updating software saves a back up copy of the updating software in the non-volatile memory before updating itself.

5. The system according to claim 3 wherein the updating software saves a back up copy of the updating software in the RAM before updating itself.

6. The system according to claim 1 wherein the updating software uses a fault tolerant technique in the updating process.

7. The system according to claim 1 wherein the verifying utilizes cyclic redundancy code.

8. The system according to claim 1 wherein the communication network comprises a wireless network.

9. The system according to claim 1 wherein the initialization software determines if the applying of the loaded updating information is successful.

10. The system according to claim 9 wherein the initialization software uses a back up copy of the at least one of firmware and updating software if the applying of the loaded updating information is not successful.

11. The system according to claim 1 wherein the initialization software continues an interrupted applying of the loaded updating information.

12. A method for updating at least one of firmware and updating software in an electronic device, using updating information received via a communication network, the method comprising:
   initializing the electronic device;
   wherein if it is determined that the updating software is to be updated, the method further comprises:
      saving a functional copy of the updating software in a working flash bank within a articular flash memory section of non-volatile memory reserved for storing said functional copy;
      after the saving, updating the updating software using the updating information to produce updated updating software;
      after producing the updated updating software, initializing the electronic device a second time; and
      completing a tri-phase boot process using a boot checker in a boot checker hank within the articular flash memory section, the tri-phase boot process involving the second initialization, a validity check, and a branching functionality to branch between the updated updating software and the saved functional copy of the updating software, both within the particular flash memory section, based on the validity check; and
   wherein if, after the first initialization, it is determined that the updating software is not to be updated, the method further comprises:
      processing any remaining updating information to update firmware, without saving a functional copy of the firmware to be updated.

13. The method according to claim 12 wherein, if it is determined that no updating needs to be done, the method further comprises performing a normal start up of the electronic device.

14. The method according to claim 12 wherein, if it is determined that the updating software does not need updating and the firmware needs updating, the method further comprises:

updating the firmware using the updating information; and
initializing the electronic device.

15. The method according to claim 12 wherein the saving of the updating software is done by storing the updating software in a non-volatile memory in the electronic device.

16. The method according to claim 12 wherein the saving of the updating software is done by storing the updating software in a random access memory (RAM) in the electronic device.

17. The method according to claim 12 wherein, if it is determined that updating the updating software was successful, the method further comprises:

enabling use of the new updating software; and
after enabling use of the new updating software, initializing the electronic device.

18. The method according to claim 12 wherein, if it is determined that updating the updating software was not successful, the method further comprises:

enabling use of the saved updating software; and
after enabling use of the saved updating software, initializing the electronic device.

19. The method according to claim 12 wherein the communication network is wireless.

* * * * *